(12) United States Patent
Clark et al.

(10) Patent No.: US 7,915,565 B2
(45) Date of Patent: Mar. 29, 2011

(54) APPARATUS AND METHOD FOR CALIBRATING A LASER DEPOSITION SYSTEM

(75) Inventors: Daniel Clark, Derbyshire (GB); Philip Anthony Carroll, Cheshire (GB)

(73) Assignee: Rolls-Royce PLC (GB)

( * ) Notice: Subject to any disclaimer, the term of this patent is extended or adjusted under 35 U.S.C. 154(b) by 671 days.

(21) Appl. No.: 11/970,726

(22) Filed: Jan. 8, 2008

(65) Prior Publication Data

US 2008/0210668 A1    Sep. 4, 2008

(30) Foreign Application Priority Data

Jan. 25, 2007    (GB) .................................... 0701397.2

(51) Int. Cl.
*B23K 26/36* (2006.01)
*B23K 26/38* (2006.01)

(52) U.S. Cl. ..................... 219/121.71; 222/71; 222/160; 73/861

(58) Field of Classification Search ............... 219/121.7, 219/121.71, 121.83; 222/23, 40, 71, 160, 222/192; 73/861
See application file for complete search history.

(56) References Cited

U.S. PATENT DOCUMENTS

| | | | |
|---|---|---|---|
| 4,522,692 A | 6/1985 | Joslin | |
| 4,566,939 A | 1/1986 | Miller et al. | |
| 5,117,087 A * | 5/1992 | Baker et al. ............... | 219/121.71 |
| 5,359,770 A | 11/1994 | Brown et al. | |
| 5,430,666 A | 7/1995 | DeAngelis et al. | |
| 5,455,998 A * | 10/1995 | Miyazono et al. ............... | 29/611 |
| 5,571,430 A * | 11/1996 | Kawasaki et al. ......... | 219/121.78 |
| 5,952,110 A | 9/1999 | Schell et al. | |
| 5,997,248 A | 12/1999 | Ghasripoor et al. | |
| 6,645,572 B2 * | 11/2003 | Seifert .......................... | 427/554 |
| 6,940,037 B1 | 9/2005 | Kovacevic et al. | |
| 7,214,904 B2 * | 5/2007 | Zeltner ...................... | 219/121.7 |
| 7,651,658 B2 * | 1/2010 | Aimone et al. ................... | 419/9 |
| 7,744,967 B2 * | 6/2010 | Gourbesville et al. ......... | 427/597 |
| 2005/0023257 A1 | 2/2005 | Pyritz et al. | |
| 2005/0056628 A1 * | 3/2005 | Hu .......................... | 219/121.84 |
| 2005/0247570 A1 | 11/2005 | Langeder | |
| 2007/0003416 A1 * | 1/2007 | Bewlay et al. ............ | 416/241 B |

FOREIGN PATENT DOCUMENTS

EP    1365107 A1    11/2003
(Continued)

OTHER PUBLICATIONS

Takaya Matsufumi et al., "Electrodeposition of chromium-silicon carbide composite coatings and their wear characteristics", Kinzoku Hyomen Gijutsu, 1987, vol. 38(3), 97-101, Japan.

*Primary Examiner* — Samuel M Heinrich
(74) *Attorney, Agent, or Firm* — McCormick, Paulding & Huber LLP

(57) ABSTRACT

A method of calibrating a high energy beam with a material source, the method comprising the steps of:
using the high energy beam to provide an aperture, depositing material from the material source towards the aperture for a selected length of time and collecting the material which passes through the aperture, and adjusting the position and/or alignment of the material source relative to the high energy beam dependant on a comparison of the amount of material collected with a predetermined value.

6 Claims, 3 Drawing Sheets

FOREIGN PATENT DOCUMENTS

| | | |
|---|---|---|
| EP | 1437425 | 7/2004 |
| EP | 1600248 A2 | 11/2005 |
| FR | 2688575 A1 | 9/1993 |
| GB | 1065858 A | 4/1967 |
| GB | 2034752 A | 6/1980 |
| GB | 2241506 A | 4/1991 |
| GB | 2449862 A | 12/2008 |
| JP | 404182085 A * | 6/1992 |
| JP | 7040145 A | 2/1995 |
| WO | 9964638 | 12/1999 |
| WO | 9964638 A1 | 12/1999 |
| WO | 2004033384 A1 | 4/2004 |
| WO | 2005038096 A1 | 4/2005 |
| WO | 2009011973 A1 | 1/2009 |

* cited by examiner

APPARATUS AND METHOD FOR CALIBRATING A LASER DEPOSITION SYSTEM

CROSS-REFERENCE TO RELATED APPLICATION

This application is entitled to the benefit of British Patent Application No. GB 0701397.2 filed on Jan. 25, 2007.

FIELD OF THE INVENTION

The invention relates to calibration equipment and in particular equipment for aligning and calibrating a laser beam with a supply of deposition powder in a direct laser deposition process.

BACKGROUND OF THE INVENTION

In a direct laser deposition process, a structure is formed directly onto a substrate. The structures are typically metallic and generated by depositing a metal powder into a melt pool formed on the substrate by heat from a laser that traverses over the substrate. The deposited powder melts in the melt pool and as the laser moves from the location to which the metal powder has been directed the deposit cools and solidifies to form a structure with a height. By making repeated passes over the same location, it is possible to increase the height of the formed structure.

Powder delivery nozzles are typically either coaxial with the laser with the powder focussing nozzle being conical around the beam optics, or arranged to the side of the laser with the powder being fed across the beam path. The powder is fed to the melt pool within an inert gas stream, usually argon. The flow characteristics of the powder flow can vary with time. Ballistic scatter, powder behaving as fume, powder collecting as "snowdrift" or "cornice" in the feed system, condensation, electrostatic agglomeration, contamination or mechanical interlocks caused by semi-fused satellite particles can all cause variation in flow rate. Similarly, as the CNC system moves or changes orientation the focal position of the powder stream can vary and ballistic scatter, caused by a variation in the particle size for example, can cause skew in the powder density distribution, which would vary with angle and stand-off distance from the work piece. The particles are also abrasive and can wear the powder feed nozzles to generate a larger orifice with a corresponding larger particle distribution and reduced focus. Powder feed nozzles can also clog with fume (metal vapour condensate), as well as suffering distortion from stray beam impingement and/or from radiant and reflected.

If the powder flow pattern is not consistent, the formed structure may not be uniform.

SUMMARY OF THE INVENTION

It is an object of the invention to seek to provide an improved apparatus and method for calibrating a powder feed with an energy beam.

According to a first aspect of the invention, there is provided a method of calibrating a high energy beam with a material source, the method including the steps of:—
using the high energy beam to provide an aperture,
depositing material from the material source towards the aperture for a selected length of time and collecting the material which passes through the aperture, and adjusting the position and/or alignment of the material source relative to the high energy beam dependant on a comparison of the amount of material collected with a predetermined value.

Preferably, the predetermined value is the calculated or determined maximum amount of material deposited by the material source in the selected length of time.

The predetermined value may be a previously calculated or determined amount of material from the material source passing through the, or another, aperture formed by the high-energy beam in the selected length of time.

Preferably, the position (which includes alignment) of the material source relative to the high energy beam is adjusted if the difference the between amount of material collected and the predetermined value is greater than a threshold.

The position of the material source relative to the high energy beam may be adjusted if amount of material collected is less than the predetermined value, or the difference the between amount of material collected and the predetermined value is greater than a threshold.

Preferably, the material is a powder.

According to a second aspect of the invention, there is provided a material collector for use in the calibration of a direct laser deposition device, the collector comprising a container having a first portion for collecting powder directed towards the apparatus and which is aligned with a laser and a second portion for collecting powder directed towards the apparatus and which is not aligned with the laser, wherein a wall divides the first portion and the second portion, the wall being formed of a material which may be perforated by the laser at a preferred perforation location.

Preferably, the dividing wall is domed or tapers away from the first portion.

Preferably, the wall has a series of struts which provides the second portion with an array of collecting wells which extend around the preferred perforation location.

Preferably, the material collector comprises detach means whereby the first portion may be detached from the second portion.

DETAILED DESCRIPTION OF THE PREFERRED EMBODIMENTS

Figure 1:
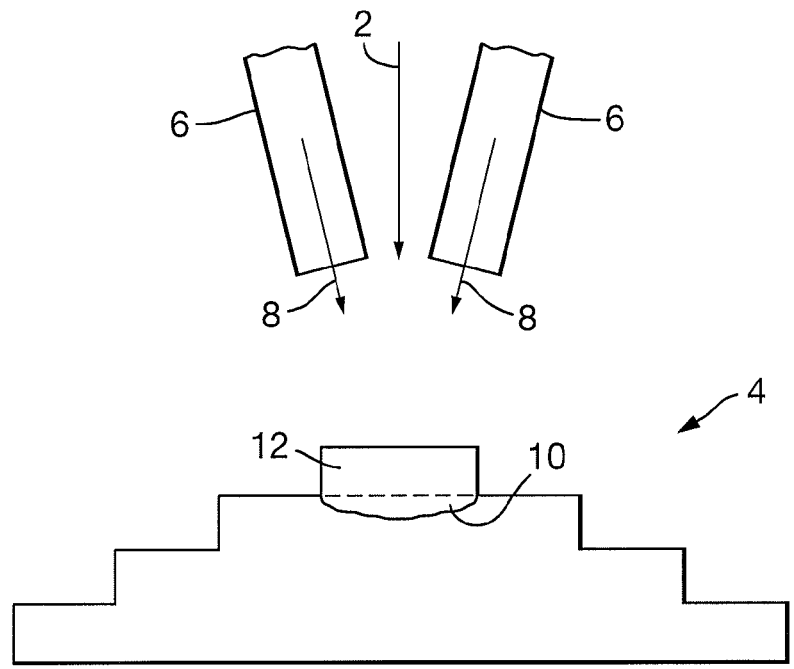
FIG. 1 depicts a typical deposition apparatus for performing direct laser deposition and a structure formed by direct laser deposition.

In FIG. 1, a beam 2, generated by a 1.8 kW HQ laser, is directed at a substrate 4. A powder process nozzle 6 is arranged coaxially with the beam axis for directing powder is directed towards the substrate. The powder nozzle may be moved independently of the beam by a series of grub screws (not shown) to enable alignment.

In operation, the beam 2 is directed at the substrate 4 to form a melt pool 10 into which the powder particles are deposited and melted. The beam 2 traverses away from the point of deposition, which allows the melt pool at that location to cool and solidify along with the deposited powder to form a structure 12.

Figure 2:
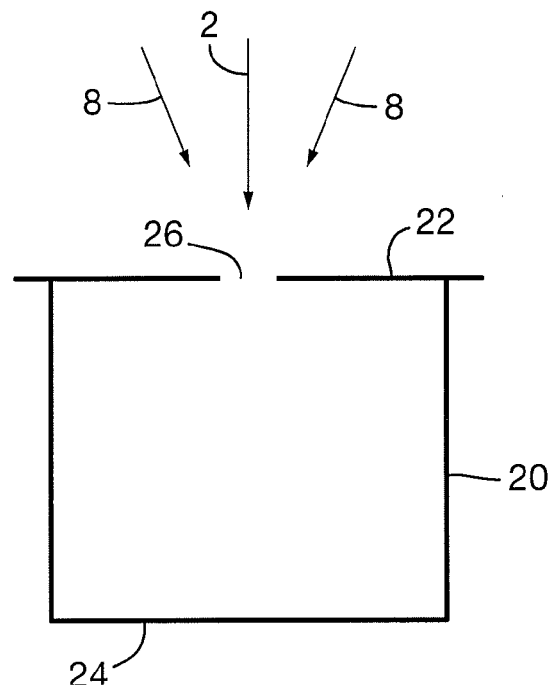
FIG. 2 depicts a first embodiment of a collector.

To ensure the powder is aligned with the nozzle it is necessary to calibrate the deposition apparatus. In one embodiment the alignment procedure is achieved with the assistance of the apparatus depicted in FIG. 2.

The apparatus comprises a container 20 with a cover 22 formed of a material, which may be ablated by the laser beam 2. For a $CO_2$ laser the preferred material of the cover is Perspex. The cover is preferably integral with the container, though there are advantages in providing a removable and replaceable cover as collected powder from the alignment process may be easily removed from the container and reused, the container may be formed of a material that is resistant to perforation by the beam and powder which may settle on the cover 22 and may contribute to an incorrect measurement of the amount of powder collected in the container will not be taken into consideration.

The container is placed in location within the direct laser deposition apparatus with the focus of the beam 2 on the cover 22. With the powder supply off the laser is switched on and a beam directed at the container 20 till a perforation 26 is made in the cover 22. The perforation has approximately the same diameter as the beam itself.

The cover can be marked with a cross-hair or another target to which the predicted position of the beam is aligned. If the beam impacts a position other than that of the target the beams true impact position can be realigned to its predicted impact position.

The repeatable attainment of consistent aperture size is important. The aperture size for a given stand-off can be measured optically every time the calibration process is performed. A significant change could be symptomatic of a change to e.g. the focal position, stand-off of the laser, angular orientation etc. Where a significant change over time or between calibrations is identified it may be necessary to change the beam optics or machine alignment to return the aperture size back to its optimum.

To avoid damage to the base 24 of the container by the beam the beam is turned off once the perforation is made. Despite the beam being defocused at this point and having a lower energy density, it may be necessary to protect the base by providing an energy absorbing coating on the base, or by placing a metal plate in the base of the container.

With the beam off, the powder flow 8 is switched on and directed towards the container. It will be appreciated that because the aperture is formed by the same laser that is used to provide heat during the deposition process alignment of the powder to the aperture is synonymous with powder to the beam itself. Consequently, powder that is correctly aligned with the beam passes through the aperture 26 and enters the container 20. Powder, which is incorrectly aligned with the beam, is prevented by entering the container by the cover 22, which acts as a mask.

The mass of the container 20 is measured before the powder flow is started. The powder is supplied to the container for a predetermined length of time, of the order 5 minutes, before the powder flow is ceased. The mass of the container is measured and compared with a predetermined value. The predetermined value is preferably the maximum amount of powder ejected from the powder head 6 in the predetermined length of time, or the pro rata predetermined length of time. If the difference between the maximum amount of powder ejected and the amount collected is greater than a threshold then the powder head is moved relative to the beam to better align the powder head and beam.

In an alternative method the predetermined value is a calculated or measured value for the amount of powder collected in the container when the above method is followed. In this case, if the amount of powder collected is less than the predetermined value then the powder head is moved relative to the beam to better align the powder head and beam.

Beneficially, the container 20 may be mounted on a set of scales such that the measurement of the mass of the container can be set to zero before additional powder is directed towards the container and consequently the container need not be moved. The calibration process is simplified as it is not necessary to re-align the aperture with the powder head, or re-drill the aperture with the laser for each measurement period.

If the system configuration is such that the container must be removed from the direct laser deposition machine before the amount of powder in the container is determined, either by weighing or otherwise, it will be necessary to re-align the aperture with the beam or, more preferably, re-drill the aperture in a new cover.

Generally, the powder carrier will be of sufficient velocity to remove powder settled on the cover of the container. However, it may occasionally be necessary to direct an additional stream of air over the upper surface.

The powder head is moved relative to the laser by any appropriate means but preferably by a series of grub screws. After movement the collection, measuring, comparison and movement steps can be repeated any number of times until the mass of powder entering the chamber within a predetermined period is at a maximum.

The acceptable and repeatable maximum value of powder ejected from the powder head can be used to determine whether alignment is maintained during operation. At regular intervals during operation, the deposition process can be interrupted and the perforate and collect procedure run for the predetermined period. In that time a mass of powder is collected and compared with the maximum value. If the mass differs from the maximum by more than a predetermined amount it may be necessary to re-run the alignment procedure. If the mass collected is within a predetermined threshold value then the deposition process can be restarted without requiring further alignment.

Figure 3:
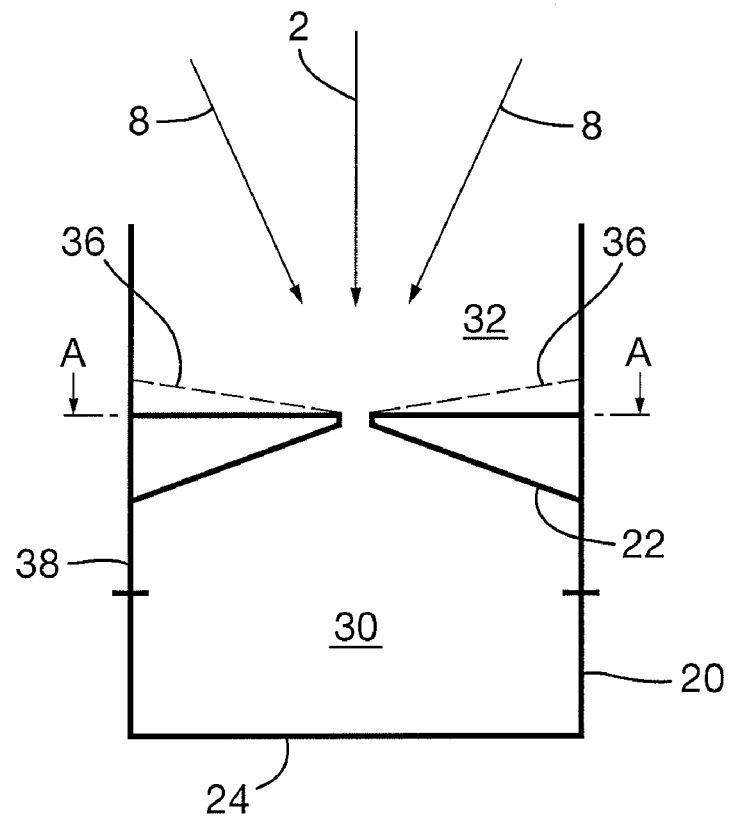
FIG. 3 depicts a second embodiment of a collector.

The alignment process can be enhanced through the use of the second embodiment of container or collector depicted in FIG. 3. In this embodiment the container is divided into a first and second collecting portion 30, 32. The first portion 30 at the lower end of the container collects the powder that is delivered by the powder head and which is aligned with the laser beam 2. The second portion 32, which is positioned above the first portion 30 collects the powder that is not aligned with the beam.

The cover 22 for the first portion is an upwardly conical or bowed wall, which also divides the first portion from the second portion. The calibration operation is substantially the same as for the first embodiment described above.

The collector is placed in the path of the laser beam, with the beam focus being on the dividing wall 22. The preferred perforation location is at the centre of the dividing wall 22, which is also at the point where the dividing wall is closest to the deposition head and therefore towards the peak of the conical or bowed wall which tapers or bows towards the top of the collector. The laser is operated to perforate the dividing wall and to form an aperture having a diameter which is substantially the same and the beam diameter.

The second portion 32 may be open topped, or may have an aperture larger than that of the beam. As the purpose of the second portion 32 is to collect substantially all of the deposited powder that is not aligned with the beam, it is preferred that the second portion 32 is open topped to permit the maximum volume of powder to enter the container.

Figure 4:
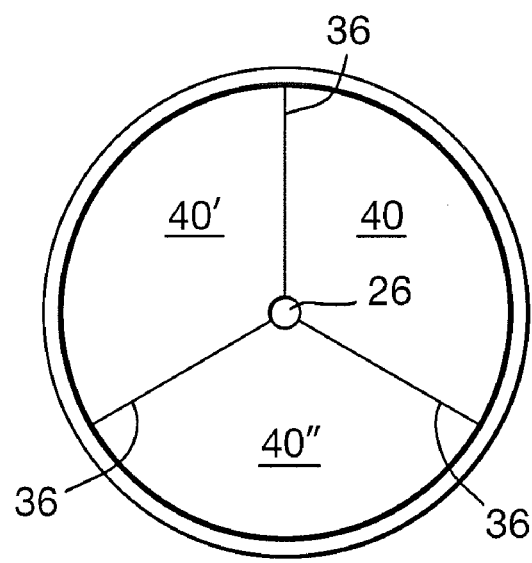
FIG. 4 is a cross-sectional view of the collector of FIG. 3 taken across section A-A.

FIG. 4 is a cross-section of the collector of FIG. 3 taken along line A-A of FIG. 3. A series of radial walls 36 extend from the cone, or bowed wall to the container wall. Preferably, there are at least three radial walls that divide at least a part of portion "B" into thirds.

The powder is directed at the collector and the powder that is correctly aligned with the aperture 26 passes through the aperture and is collected in the first portion 30. Powder, which is incorrectly aligned with the aperture, is collected in the second portion 32. Following a predetermined period of powder supply, the powder is switched off and the collector removed from the deposition equipment.

The first portion 30 and the second portion 32 are separated from each other by break means 38, which is either a frangible point, or a screw connection. The amount of powder in the first portion 30 is measured and comparisons made with a predetermined value determined as for the first embodiment described above.

Beneficially, by providing the radial arms 36 for the second portion 32 an array of wells 40, 40' and 40'' is formed that extend around the aperture 26. The wells enable the powder distribution in the second container 32 to be determined optically. Once the powder distribution is known it is possible to determine in which direction to move the powder head to bring it into alignment with the aperture. The alignment process is therefore simplified and quickened.

A new collector is placed in the path of the beam and the alignment process repeated till the maximum amount of powder is received in the first container 30 with an even distribution of any powder collected in the second portion 32.

The powder ejected from a powder head, especially where the supplied from the side of the beam axis, or where the laser and powder is being directed towards the substrate along an angle which is non-vertical, can suffer from ballistic droop. Ballistic droop affects the powder delivery such that gravity causes a change in the actual position to which the powder is delivered from the desired position.

Figure 5:
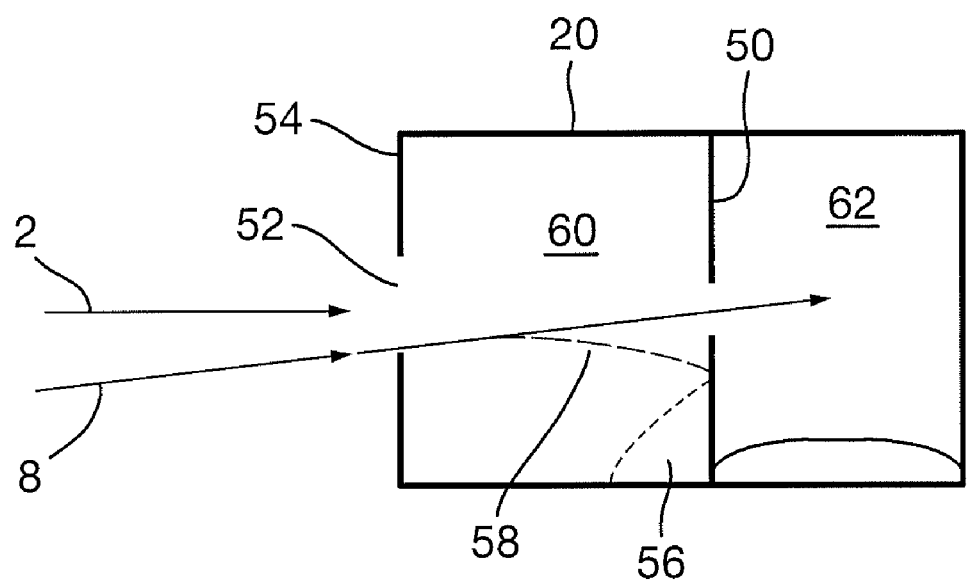
FIG. 5 is a view of apparatus in accordance with the invention in a non vertical orientation.

To accommodate ballistic droop and to test the calibration of the laser with the powder when directed along a non-vertical axis, the collector can be arranged such that the cover is presented at a non-horizontal angle. As shown in FIG. 5, the collector is arranged with an additional barrier 50.

The laser is focussed on the barrier 50, but also perforates an opening 52 in the cover 54. The barrier 50 is at the deposition stand-off distance. Powder from powder head 8 is directed at the aperture 50 whilst the laser is not operating. Mis-aligned powder will not enter the first collector 20 as it will not pass through the aperture 52.

Powder that is affected by ballistic drag will follow the marked trajectory 58, will impact against barrier 50 and will collect 56 in the first compartment 60. Powder with sufficient velocity such that it is not significantly affected by ballistic drag till it has travelled beyond the stand-off distance will pass through the aperture in the barrier 50 and will collect in the second compartment 62.

Compartment 60 and 62 are separable and may be weighed independently to calculate the effects of the ballistic drag and the alignment of the powder with the laser. If the powder is being significantly affected by the drag then the velocity of the air stream can be increased to reduce its affect, or the alignment of the powder feed can be adjusted to compensate.

It will be appreciated that the calibration method of the invention is a low energy method as the laser can be switched off once the membrane has been perforated. Also, the power of the laser can be reduced from the power level typically used to for the deposition process to a level above that required to perforate the material of the cover.

Also, the new technique and apparatus also traps the powder, which is the same powder as used in the actual deposition process, and which may be flammable, carcinogenic or a source of contamination for other operations. As the powder is collected it can be re-cycled to be used in a later deposition process. This re-use is cost-effective especially where the cost of the powder is high.

Additionally, it will be appreciated that the new technique and apparatus enables the location of powder impact to be determined without requiring additional optical detection involving lasers, which have their own alignment issues and are expensive.

Also, it is possible to check alignment of the powder head with the laser at regular intervals. A separate off-stream alignment station comprising a weighing station or other measurement device may be provided to which the powder head and laser are moved when performing the calibration.

With a minor modification to the arrangement it would be possible to check the alignment of the powder head with the beam over a traverse. The laser is operated for a predetermined period whilst the deposition head is moved over a collector on a known path (straight, curved or circuitous) to form a slot in the cover. The deposition head is moved back to the start position and, with the laser off but the powder on, the deposition head moves along the same path to deposit powder, which is collected in the collector. The amount of powder collected can then be determined using known techniques.

A number of collectors may be placed at known positions so as to connect the position of the laser with a "real world" position. The collectors could be distributed around the working envelope in various positions and orientations to understand the effect of machine position and orientation on powder distribution.

We claim:

1. A method of calibrating a high energy beam with a material source, the method comprising the steps of:—
   using the high energy beam to provide an aperture in a surface of a container,
   depositing material from the material source towards the aperture for a selected length of time;
   collecting the material which passes through the aperture;
   comparing the amount of material collected with a predetermined value; and
   adjusting the position of the material source relative to the high energy beam dependant on said comparison.

2. A method according to claim 1, wherein the predetermined value is the calculated or determined maximum amount of material deposited by the material source in the selected length of time.

3. A method according to claim 1, wherein the predetermined value is a previously calculated or determined amount of material from the material source passing through the aperture formed by the high energy beam in the selected length of time.

4. A method according to claim 2, wherein the position of the material source relative to the high energy beam is adjusted if the difference the between amount of material collected and the predetermined value is greater than a threshold.

5. A method according to claim 3, wherein the position of the material source relative to the high energy beam is adjusted if amount of material collected is less than the predetermined value, or the difference the between amount of material collected and the predetermined value is greater than a threshold.

6. A method according to claim 1, wherein the material is a powder.

* * * * *